United States Patent
Zeck

(10) Patent No.: US 7,389,786 B2
(45) Date of Patent: Jun. 24, 2008

(54) ULTRASONIC AND SONIC ODORIZATION SYSTEMS

(76) Inventor: Mark Zeck, 3205 Stanolind, Midland, TX (US) 79705

( * ) Notice: Subject to any disclaimer, the term of this patent is extended or adjusted under 35 U.S.C. 154(b) by 653 days.

(21) Appl. No.: 10/990,629

(22) Filed: Nov. 17, 2004

(65) Prior Publication Data

US 2005/0112020 A1 May 26, 2005

Related U.S. Application Data

(60) Provisional application No. 60/524,118, filed on Nov. 21, 2003.

(51) Int. Cl.
*G05D 11/13* (2006.01)
(52) U.S. Cl. .......................... 137/9; 48/195; 73/861.28; 73/861.41; 137/98; 137/605
(58) Field of Classification Search ................. 137/3, 137/9, 98, 101.19, 101.21, 605, 606, 607, 137/551; 48/195; 73/861.28, 861.41
See application file for complete search history.

(56) References Cited

U.S. PATENT DOCUMENTS

| | | | | |
|---|---|---|---|---|
| 3,219,046 A | * | 11/1965 | Waugh | 137/8 |
| 3,557,616 A | * | 1/1971 | Landon et al. | 73/861.73 |
| 4,246,969 A | * | 1/1981 | McLoughlin et al. | 169/13 |
| 4,328,801 A | * | 5/1982 | Marx et al. | 604/65 |
| 4,611,294 A | * | 9/1986 | Stanfill | 700/68 |
| 5,228,347 A | * | 7/1993 | Lowell et al. | 73/861.28 |
| 5,632,295 A | * | 5/1997 | Smars | 137/3 |
| 6,208,913 B1 | * | 3/2001 | Marshall et al. | 137/3 |
| 6,253,779 B1 | * | 7/2001 | Nanaji et al. | 137/3 |
| 2001/0047621 A1 | * | 12/2001 | Arnold | 48/195 |

* cited by examiner

*Primary Examiner*—Stephen M Hepperle
(74) *Attorney, Agent, or Firm*—Charles D. Gunter, Jr.

(57) ABSTRACT

A system is shown for injecting a chemical, such as an odorant, from a chemical supply into a fluid containing system such as a natural gas pipeline or an LPG pipeline. A tank of odorant is maintained under a positive pressure which exceeds that of the pipeline. An injection conduit communicates the odorant tank with the pipeline. A precise control flow valve, located within the injection conduit, meters odorant to be injected into the pipeline. An ultrasonic measuring unit allows the odorant to be metered on a drop wise basis with drops of chemical being counted as they pass through the flow valve into the injection conduit and into the natural gas pipeline. The ultrasonic measuring unit also allows steady state flow conditions to be measured accurately. A sonic measuring unit can also be utilized in low flow situations.

7 Claims, 2 Drawing Sheets

ULTRASONIC AND SONIC ODORIZATION SYSTEMS

CROSS REFERENCE TO RELATED APPLICATIONS

The present application claims priority from earlier filed U.S. Provisional Patent Application Ser. No. 60/524,118, filed Nov. 21, 2003 and entitled "Ultrasonic and Sonic Odorization Systems."

BACKGROUND OF THE INVENTION

1. Field of the Invention

The present invention relates generally to systems for injecting chemicals into pipelines and, more specifically, to an improved system and method for adding odorant to natural gas or liquified petroleum gas flowing in a pipeline.

2. Description of the Prior Art

There are many instances in which it is desirable to inject chemical of various types into fluids (gas and liquids) flowing in pipelines. One such example is in the area of natural gas pipelines. In addition to such substances as corrosion inhibitors and alcohol to inhibit freezing, odorants are commonly injected into natural gas pipelines. Natural gas is odorless. Odorant is injected into natural gas in order to provide a warning smell for consumers. Commonly used odorants include tertiary butyl mercaptan (TBM). Such odorants are typically injected in relatively small volumes normally ranging from about 0.5 to 1.0 lbs/mmscf.

The odorants are typically provided in liquid form and are typically added to the gas at a location where distribution gas is taken from a main gas pipeline and provided to a distribution pipeline. In such circumstances, the gas pressure may be stepped down through a regulator from, for example, 600 psi or more, to a lower pressure in the range of 100 psi or less. The odorants can also be added to the main transmission pipeline in some situations.

As will be apparent from the above discussion, the odorants which are added to natural gas are extremely concentrated. Odorants such as TBM and other blends are mildly corrosive and are also very noxious. If the job of injecting odorant is not performed accurately, lives are sometimes endangered. It would be possible for a homeowner to have a gas leak with a leak not being realized until an explosion had resulted if the proper amount of odorant was not present.

Also, if a leak of odorant occurs at an injection site, people in the surrounding area will assume that a gas leak has occurred with areas being evacuated and commerce being interrupted. Contrarily, if such mistakes become common, people in the surrounding area will become desensitized to the smell of a potential gas leak and will fail to report legitimate leaks.

Two techniques are commonly used for providing odorization to natural gas in a main distribution pipeline. The first technique involves the injection of liquid odorant directly into the pipeline. A high pressure injection pump pumps the odorant from a liquid storage tank into a small pipe which empties directly into the main gas pipeline. Because odorant is extremely volatile, drops injected to the pipeline immediately disperse and spread throughout the gas in the pipeline. In this way, within a few seconds, the drops of liquid odorant are dispersed in gaseous form. U.S. Pat. No. 6,208,913, issued Mar. 27, 2001, to Marshall and Zeck, and U.S. Pat. No. 5,490,766, issued Feb. 13, 1996, to Zeck, both show state of the art fluid pumps for injecting odorant.

In the prior art systems, the flow of gas in the pipeline is typically metered so that liquid odorant can be injected periodically. For example, a few drops of odorant will suffice for a 1000 SCF flow of natural gas. When the gas flow meter indicates that 1000 SCF of natural gas have flowed through the pipe, the corresponding previously determined amount of liquid odorant is injected into the pipeline. As another 1000 SCF of gas flows past the injection site, another injection of odorant is performed. Even though the injection is performed on a periodic basis, the odorant diffusion within the gas provides for adequate levels of odorant throughout the pipeline, assuming the time between injections is not too great.

There are several disadvantages with this prior art technique. As mentioned above, the odorant liquid is extremely noxious. The injection pump must therefor be designed so that no odorant can leak. This requires a pump design which is relatively expensive and complex in order to meet the required operating conditions. In even such sophisticated systems, there is an unpleasant odor present when working on the pump which can make people think that there is a natural gas leak.

Another technique for odorizing a natural gas pipeline involves bypassing a small amount of natural gas at a slightly higher pressure than the pressure of the main distribution pipeline, through a tank containing liquid odorant. This bypass gas absorbs relatively high concentrations of odorant while it is in the tank. This heavily odorized bypass gas is then placed back into the main pipeline. The odorant, now volatalized, is placed back into the main pipeline and diffuses throughout the pipeline in much the same manner as described with respect to the liquid injection system. U.S. Pat. No. 6,142,162, issued Nov. 7, 2000, to Arnold, shows such a method for odorizing natural gas in a pipeline utilizing bypass piping in conjunction with a liquid odorant storage tank.

One disadvantage of the bypass system is the fact that the bypass gas picks up large and inconsistent amounts of odorant from the liquid in the tank and becomes completely saturated with odorant gas. As a result it is necessary to carefully monitor the small amounts of bypass gas which are used. Also, natural gas streams typically have contaminates such as compressor oils or condensates which can fall out into the odorant vessel in bypass systems. These contaminates create a layer that reduces the contact area between the liquid and the bypass stream. This necessarily degrades the absorption rate of the stream.

In U.S. Pat. No. 7,056,360, issued Jun. 6, 2006, entitled "Optical Odorization System", by Zeck, there is shown an improved system for odorizing natural gas flowing through a pipeline by injecting odorant into the pipeline at a controlled rate. The system includes an odorant storage tank containing an odorant to be injected. A pressurized source of inert gas, such as nitrogen, communicates with the odorant storage tank for maintaining the tank at a desired positive pressure above the pressure of the natural gas pipeline. An injection conduit communicates the odorant storage tank with the pipeline. A photooptic metering means, located within the injection conduit, meters odorant to be injected into the pipeline.

The odorization system described in pending Ser. No. 10/287,392 was extremely simple as compared to existing positive displacement pump systems. The system offered improved ease of understanding, operation and maintenance. As compared to the prior art systems, the system described therein offered more accurate control, verification (drop counting) and communication (alarms, status, etc) than the prior art systems. The system offered generally smell free operation and maintenance.

Despite these advantages, the previously described optic system was necessarily limited in some respects by the nature of the optic system. For example, a window or view glass was required into the drop chamber which added to the weight and expense of the system. It was not possible to odorize liquified petroleum gas, since the system depended upon drops being metered into a gaseous medium. Similarly, since it was not possible to measure both drops and steady flow, the "turn down" ratio of the system was limited.

There continues to be a need for improvements in odorization systems of the above described types.

SUMMARY OF THE INVENTION

The present invention has as its object to provide even further advantages over the previously described systems.

The present invention has as its object to provide a system for injecting chemicals into a pipeline, such as in the case of odorizing natural gas, which is simpler in design and more economical in operation than the prior art systems, which is more reliable, and which can be used in both small and large flow applications as well as to inject chemicals into liquified petroleum gas (LPG) pipelines.

A system is shown for injecting a chemical, such as an odorant, from a chemical supply into a fluid containing system at a desired injection rate. The fluid containing system can be, for example, a natural gas pipeline or a LPG pipeline. The system includes a chemical storage tank containing a chemical to be injected. The chemical storage tank communicates with the natural gas pipeline by means of an injection conduit. A pressurized gas source or other pressure head, communicates with the chemical storage tank for maintaining the tank at a desired positive pressure above the pressure of the pipeline. A metering valve, located within the injection conduit, meters chemical to be injected into the pipeline. The chemical is metered on a drop wise basis with individual drops of chemical being counted as they pass through a measuring unit into the injection conduit and into the pipeline. Alternatively, the chemical may flow as a steady stream of liquid. In the most preferred embodiment of the invention, the measuring unit includes one or more pairs of ultrasonic transmitters and receivers which act as either proximity sensors or by measuring transit time to provide a measurement of the flow rate of odorant on either a drop basis or in a steady state flow condition.

In another embodiment of the invention, liquid drops land on the diaphragm of a piezoelectric sensor and thereby generate sound waves. The sound waves are transmitted to an associated crystal which, in turn, generates a proportional electric charge which results in a voltage difference between two electrodes. The resulting voltage spikes can be counted and measured.

Additional objects, features and advantages will be apparent in the written description which follows.

DETAILED DESCRIPTION OF THE INVENTION

Figure 1:
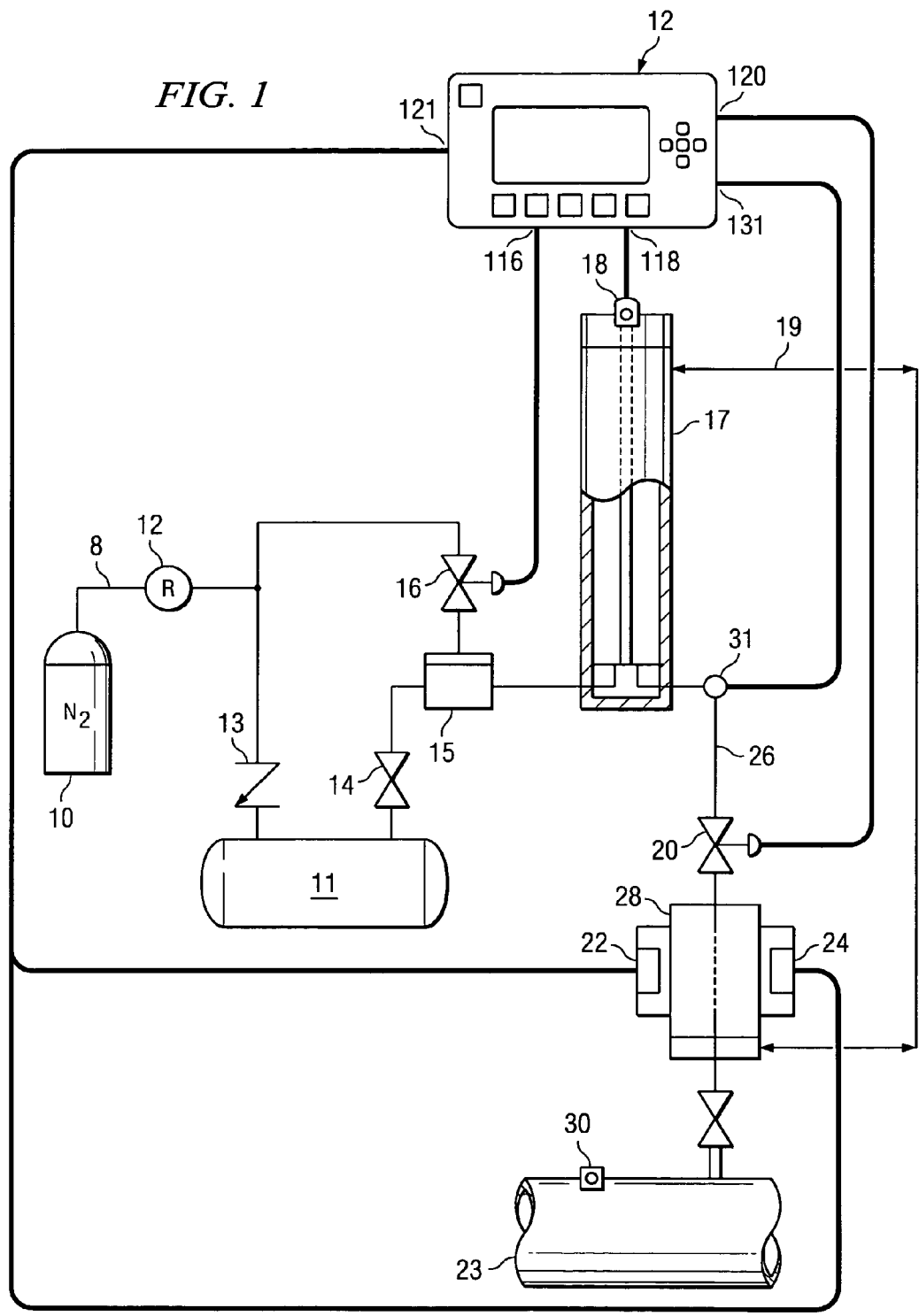
FIG. 1 is a schematic representation of the ultrasonic odorization system of the invention.

The present invention offers several unique advantages over existing chemical injection and odorization systems in both small and larger flow rate applications. It has particular applicability to odorization systems for natural gas pipelines and LPG pipelines but those skilled in the art will understand that the system can also be used to inject other chemical substances, such as alcohol to inhibit freezing, corrosion inhibitors, and the like.

A number of problems inherent in the prior art systems are overcome with the odorization system of the invention. As mentioned under the "Background" discussion above, low flow rate systems such as those typically found in city distribution systems have typically been difficult to odorize accurately. A low pressure environment does not provide a positive seating action for positive displacement (fluid pump) type odorization systems. Such systems require a pump inlet pressure that is precariously close to the natural gas pipeline pressure, thereby inviting free flow or volume surges in the system. In the low flow rate situation, the amount of odorant per stroke is extremely small. The current systems tend to vapor lock or have such a long time between injections that gas is not evenly odorized. These low flow rate systems also need to be located where the distribution system is located. Thus, they are commonly surrounded by hospitals, schools, metro areas and other residential areas. The currently available injection systems are complex and do not contain fugitive emissions during maintenance. During operation, many of these systems exhaust natural gas into the air with every stroke of the injection pump.

There are also known disadvantages associated with the high flow rate applications. These high flow rate applications are typically found on interstate gas pipelines, for example. One disadvantage is the turn down ratio associated with such systems. On theses systems gas flow rate can range considerably. When a positive displacement pump is sized for lower end capacity, it is required to work too hard at the upper end. This causes wear on the equipment prematurely. Sometimes the upper end demand cannot be met and desired odorization levels cannot be met. As a result, hybrid dual pump configurations have been tried in the past, resulting in expensive and complex system designs. When the pump is sized for the higher end of demand, the time between strokes is excessive. This results in dead spots. As a result, the gas is not evenly odorized.

Another disadvantage of the high flow applications is the fact that the larger pumps suffer a greater failure rate with subsequent leakage, due to increased surface area of the diaphragms and seals. Considerable actuation gas (normally natural gas) is required to actuate the pump. These systems also suffer from winter freeze blockages and exhaust natural gas to the atmosphere.

The present invention overcomes the deficiencies of the prior art by providing a system for injecting a chemical from a chemical supply, such an odorant for natural gas, into a fluid containing system, such as a natural gas pipeline or an LPG pipeline. Rather than utilizing an injection pump, the present system utilizes an odorant storage tank which, in the preferred form, is pressurized by a source of inert gas, thereby maintaining the tank pressure at a desired positive pressure above the pressure of the gas pipeline to be odorized. Alternatively, the storage tank can be located appropriately to allow gravity feed of the odorant with a pressure "head" being used to move the odorant from the tank through an injection conduit to the natural gas pipeline. An extremely accurate metering valve is provided within the injection conduit which communicates odorant from the odorant storage tank to the pipeline. The metering valve is adjustable between a drop wise setting for metering chemical into the pipeline on a drop by drop basis and a steady flow setting for metering chemical on a steady state flow basis. A measuring unit is also associated with the metering valve for measuring flow passing through the metering valve and into the pipeline. In the most preferred form, the measuring unit including one or more pairs of ultrasonic transmitters and ultrasonic receivers which act as either proximity sensors or by measuring transit time to provide a measurement of the flow rate of odorant on either a drop basis or in a steady state flow condition.

The invention can best be understood with reference to FIG. 1 which illustrates the principal components of the system in simplified, schematic fashion. The system includes a chemical storage tank 11 which contains a chemical to be injected. In the preferred form of the invention, the tank 11 is used to store a suitable odorant for natural gas such as the tertiary butyl mercaptan (TBM). The odorant contained within the tank 11 must be at a positive pressure which exceeds the pressure of the natural gas pipeline 23 into which the odorant is to be injected. In the preferred system, a pressurized gas source such as nitrogen tank 10 communicates with the chemical storage tank 11 by means of conduit 8 and regulator valve 12 for maintaining the tank 11 at a desired positive pressure above the pressure of the natural gas pipeline 23. For example, if the pipeline 23 is maintained in the range of 300 to 400 psi, the storage tank 11 can be maintained in the range of 500 psi by means of nitrogen blanket provided by the nitrogen tank 10. In the example illustrated in FIG. 1, a check valve 13 is also present in the conduit 8.

While the preferred form of the invention utilizes a pressurized storage tank 11, it will be understood that gravity feed could also be utilized, if desired. In this configuration, the odorant vessel 11 would be mounted above the injection point. The top of the tank 11 could be connected to the pipeline 23 to provide a pressure source while the bottom of the tank would be in communication with the injection conduit.

Returning to the schematic illustration of the method shown in FIG. 1, the vapor pressure of the liquid in the tank 11 forces odorant upwardly through probe assembly 14 to the inlet valve 15. The probe assembly can simply be an isolation valve with tubing welded on and extending into the tank interior. A controller (illustrated schematically as 12 in FIG. 1) provides a means to input odorant properties, desired injection rates and gas flow rate data to the system. When the controller 12 opens solenoid valve 16, gas supply opens isolation valve 15 and odorant begins to fill an external injection chamber 17. The odorant level in the injection chamber 17 is measured and monitored by sensor 18 which communicates with controller 12. As the odorant level in the injection chamber 17 increases, natural gas in injection chamber 17 is pushed through conduit 19 to the natural gas pipeline 23. In this way, no fugitive emissions escape the system to the atmosphere.

The system of the invention also includes a metering valve 20 which is opened by the controller 12 to achieve desired dosing rates. The flow through the metering valve 20 is monitored by a mating pair or pairs of ultrasonic transmitters and receivers 22, 24 (to be described in greater detail), and the level sensor 18 and the controller 12. With respect to the simplified schematic of the process illustrated in FIG. 1, the sensor 18 can be ultrasonic, optical, or an inductive or capacitance type sensor. The level sensor 18 and controller 12 can be used independently or in conjunction to perform the monitoring function.

As previously mentioned, the controller 12 provides a means to input odorant properties, desired injection rates and gas flow rate data. The controller uses this input, as well as live data, to adjust the metering valve 20 to deliver the desired injection rate, proportional to the gas flow passing down the pipeline 23. When the level in the chamber 17 reaches a predetermined lower set point, the filling process begins again. All measurement uses the fluid's temperature as measured by temperature sensor 31 to convert volumetric measurement to mass measurement.

The metering valve (20 in FIG. 1), is located within the injection conduit 26 for metering odorant to be injected into the pipeline 23. In one mode of operation of the system, the odorant is metered on a drop wise basis with individual drops of odorant being counted as they pass through the injection conduit 26 into the pipeline 23. This mode of operation is referred to herein as the "drop wise" mode of operation. The metering valve 20 controls the flow rate in all modes of operation. In either the drop mode or steady state flow mode, the ultrasonic transmitters and receivers 22, 24 can be operated to provide measurements independently, the level monitor 18 in the chamber 17 can be operated independently, or they can be used together for verification or redundancy. If high flow rates that take the metering means out of the drop wise mode are anticipated, the metering or flow control valve 20 continues to control odorant flow during this period. Other empirical data, either current or historical, can also be utilized. The controller 12 calculates drop size based on temperature, pressures, physical constants of the odorant blend and orifice size. The drop size can thus be verified and adjusted.

The preferred metering means of the invention utilizes a flow control valve 20 which is capable of metering extremely precise amounts of odorant. As will be apparent from the following discussion, the metering means of the invention is also adjustable between a drop wise setting for metering chemical into the pipeline on a drop by drop basis and a steady flow setting for metering chemical on a steady state flow basis. The steady state flow measurement is made possible because of the particular type of ultrasonic measuring means utilized in the system of the invention, as will be described in greater detail below.

A particularly preferred flow control valve 20 is a motor driven needle valve which is capable of metering individual drops of odorant. The motor controlled needle valve 20 is an ultra fine valve which, in one preferred form, is less than a 1 degree taper, twenty turn needle valve with the needle orifice being on the order of 0.032 inches. This motor controlled valve, unlike typical servo controlled valves conserves energy when not being required to move. When the valve is required to move, the motor precisely adjusts the valve to obtain the proper Cv. The needle is used to control the valve's flow coefficient in order to obtain the smallest amount of odorant that can be dispensed and also measured as it is injected into the pipeline. Unlike the prior art pulses provided by solenoid valves, the present system has the capability to account for every drop of odorant. When the flow rate increases to a stream, there are no gaps of odorization in the present system. The system of the invention offers advantages over both pulse and pump systems in these respects.

As described above, the measuring means of the invention includes a measuring unit associated with the metering valve 20 for measuring flow passing through the metering valve and into the pipeline. The measuring unit includes one or more pairs of ultrasonic transmitters 22 and ultrasonic receivers 24 which act as either proximity sensors or by measuring transit time to provide a measurement of the flow rate of odorant on either a drop basis or in a steady state flow condition.

The general principles of operation of ultrasonic devices of the type under consideration will be familiar to those skilled in the relevant arts. Briefly stated, the ultrasonic transducers which are utilized in the system of the invention act either upon the "transient time" principle or as simple proximity sensors. Ultrasonic "transit-time" flow measurements are made utilizing one or more pairs of ultrasonic transmitters and receivers, for example, sensors 22, 24 mounted on the exterior of a pipe or drip chamber 28. The transducers can be mounted directly on existing piping, thereby providing a non-intrusive measurement system. Measurements are made by sending bursts of signals through the wall of the pipe or drip chamber. The measurement of flow is based upon the principle that sound waves traveling in the direction of flow of the fluid require less time than when traveling in the opposite direction. At zero velocity, the transit-time or Delta T is zero. At zero flow, both sensors receive the ultrasonic signals sent at the same time, i.e., without a transit-time difference. With a flowing fluid, the ultrasonic waves require differing lengths of time (flow dependent) to reach the corresponding sensor. This transit-time difference is directly proportional to the flow velocity.

Because the diameter, wall thickness and material of the drip chamber are known, the angle of refraction can be calculated. This allows the accurate spacing of the transducers.

In the drop mode, the transducers are working as simple proximity detectors that accurately count drops due to the space between drops. As the system reaches steady flow, they again work as flow meters. The transducers used in the system of the invention are available from a number of sources. For example, Endress & Hauser of Grants Pass, Oreg., markets the "Prosonic Flow™" line of transducers which are typical of the general category of transducers which are acceptable for purposes of the present invention.

The preferred odorization system of the invention utilizes a microprocessor based controller 12 in its operation. For example, in one embodiment of the invention a controller, operative under the control of a program stored therein, is provided to precisely adjust the motor driven needle valve 20 used for metering individual drops of chemical. In the "drop wise" mode of operation, the controller has inputs connected to a flow meter 30 of the type commonly present in the pipeline. A temperature sensor (not shown) is located in the odorant stream. As will be familiar to those skilled in the art, flow meter 30 generates a signal proportional to the flow of gas within the pipeline 23. The flow meter 30 can provide a digital pulse, or an analog signal, each time a known quantity of gas flows through pipeline 23.

An operator or supervisor inputs parameters for the particular system under consideration that permit flow and mass calculations to be accomplished. For example, these inputs can include those shown in Menu #3 which follows. Alarm functions can also be defined within the controller, as shown in Menu #2 which follows. In the preferred system, the processor measures the amount of time the transducers 22, 24 are interrupted by droplets. This time can be correlated to the size of each droplet. When compared to the input parameters and/or historical data and combined with the dynamics unique to each odorant blend, this information provides relative droplet mass. The mass calculation permits the invention to (1) provide another method of verification of the amount of odorant being dispensed into the pipeline; or (2) operate without the feedback from a level monitor or with a feedback of smaller resolution.

Figure 3:
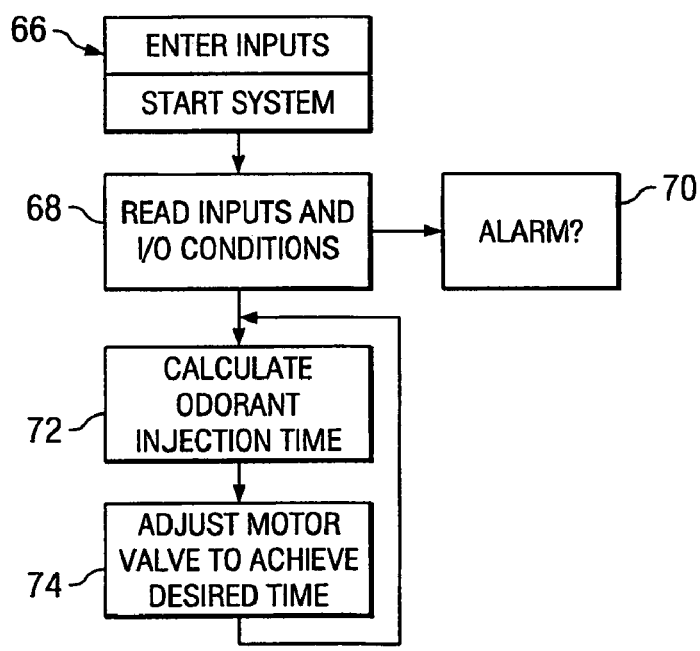
FIG. 3 is a flow chart of the controller operation.

FIG. 3 is a flow chart of the controller operation. The operator enters the various inputs to be described in step 66. The controller reads the inputs and 110 conditions in a step 68. As will be described with respect to the menus which follow, this can generate one or more alarms 70. In the next step 72, the controller calculates the odorant injection time. In step 74, the servo of the needle valve 31 is instructed to adjust the needle orifice to achieve the desired drop time.

Figure 2:
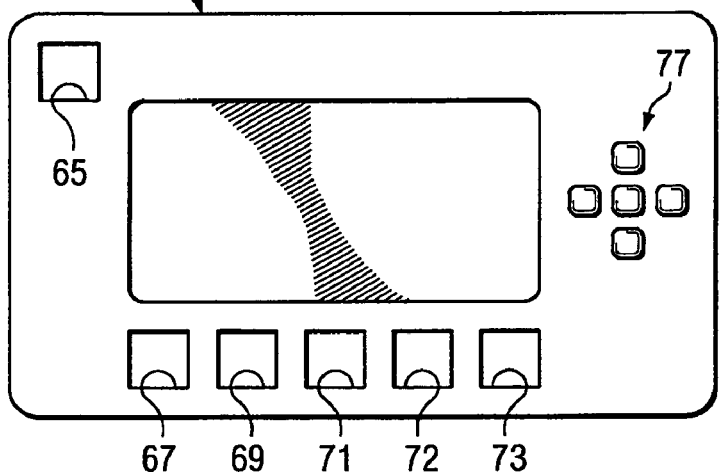
FIG. 2 is a simplified view of the controller display used in the practice of the invention.

FIG. 2 shows the controller display used in the preferred system. An on/off switch 65 enables the system to odorize. A main switch 67 flashes green as a drop flashes through the needle valve 49. An alarm switch 69 takes the user to the following menu # 2. The input switch 71 takes the user to the input parameter menu # 3 which follows. I/O switch 73 allows the user to access the I/O conditions found in menu #4. Finally, history switch 75 takes the user to the history menu # 5 which follows. Data can be entered by means of the keypad or toggle 77.

Menus

1. Primary Window

|  | Time |
|---|---|
| 1/08 #/Mmscf | Current Injection Rate |

2. Alarms

| 1 | Injection Rate | Low/High |
|---|---|---|
| 2 | Flow Signal | Lost |
| 3 | Storage Level | Low |
| 4 | Ultrasonics | Sensor Down/LED Down |

3. Input Parameters

| 1 | Injection Rate | 1.00#/MMscf | Drop Only/Full Range |
|---|---|---|---|
| 2 | Max. Gas Flow/Assumed Gas Flow | 3.05 MMschfh | 20 mA/50 pps/fixed |
| 3 | Max Injection Rate | 2.00#/MMscf | |
| 4 | Odorant Blend | ChevPhillips/NGO/AtoFina | BP Capatin 20/... |
| 5 | Orifice | A/B/C/... | |
| 6 | Options | Level/None | |
| 7 | Date/Time | Oct. 22, 2002 | 14:01 CST |
| 8 | Contract Time | 07:00 | |

4. I/O Conditions

| 1 | Remote | Enabled/disabled | Input |
|---|---|---|---|
| 2 | Gas Flow | 1.55 MMscfh | Input |
| 3 | Odorant Temperature | 30 F | System Input |
| 4 | Level | 40% | System Input |
| 5 | Valve Position | 20.35% | System Input |
| 6 | Valve Position | 19.69% | System Output |
| 7 | Alarm | Active/None | Output |
| 8 | Injection Rate | 1.08 #/Mmscf | OUtput |

5. History

| 1 | Today | 0.01 lbs |
|---|---|---|
| 2 | Yesterday | 0.43 lbs |
| 3 | Oct. to Date | 5.83 lbs |
| 4 | September | 11.54 lbs |
| 5 | August | 10.73 lbs |

Figure 4:
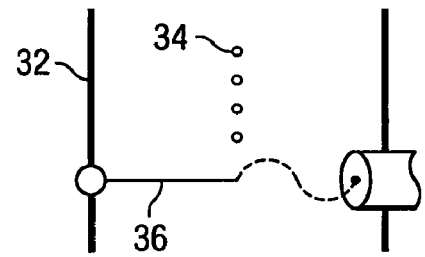
FIG. 4 is a simplified view of an alternative sonic measuring technique.

The most preferred embodiment of the invention has been described with respect to an ultrasonic measuring system which includes ultrasonic transmitters and receivers (22, 24 in FIG. 1). However, as shown in simplified fashion in FIG. 4, a sonic system of measurement could be utilized in, for example, low flow situations. FIG. 4 shows an alternative drip chamber 32 through which drops of odorant 34 are falling. As the drops of liquid odorant 34 land on an impingement surface 35, a sound wave is generated. The surface 36 can be, for example, the diaphragm of a piezoelectric, i.e., essentially a microphone. The force each wave generates is transmitted to a crystal associated with the sensor. The crystal, in turn, generates a proportional electric charge which results in a voltage difference between two electrodes. The controller 12 counts and measures the resulting voltage spikes which are produced.

An invention has been provided with several advantages. The odorization system of the invention is extremely simple as compared to existing positive displacement pump systems. The system offers improved ease of understanding, operation and maintenance. As compared to the prior art systems, the present system offers more accurate control, verification (drop counting) and communication (alarms, status, etc) than the prior art systems. The present system can measure either gases or the steady state flow of liquids, such as LPG. The drop mode of injection offers extremely small volumes which are injected frequently for more even odorization. The continuous flow nature of the drop feed completely eliminates dead spots in the system. The two streams of fluid (natural gas and odorant) are blended evenly and proportionately. Compared to the prior art systems, the system of the invention offers a smell free operation and maintenance. No gas is exhausted to the atmosphere.

Unlike an optic system, the system of the invention does not require a view window with its seals, or the expensive coatings which are needed to eliminate reflection to allow accurate light transmission and reception. An optical system requires a liquid drop surrounded by gas. This means that only natural gas can conveniently be odorized and not LPG. The present system measures both drops and steady flow. Because the present system uses ultrasonic sensors and transmitters, there is no need to penetrate the drip chamber, thereby offering a non-obtrusive measuring system.

The system of the invention offers redundancy of measurement, if desired. Also, the pressure differential on the metering valve is constant, offering additional predictability. Other systems have a wide ranging δP to Cv. The odorization system of the invention can be used in situations which range from the smallest of flow rates to the largest. The large turn-down ratio of the metering valve provides for a wide range of applications for the system. If the drops passing through the drip chamber can be counted (at low flow rate situations), they are counted by the ultrasonic sensors 22, 24. If the flow rate exceeds the maximum drip frequency of the system, then the calibrated injection chamber 17 can be used to measure the flow of odorant.

While the invention has been shown in only two of its forms, it is not thus limited but is susceptible to various changes and modifications without departing from the spirit thereof.

What is claimed is:

1. A system for odorizing natural gas flowing through a pipeline by injecting odorant into the pipeline at a controlled rate, comprising:

an odorant storage tank containing an odorant to be injected;

a pressurized source of inert gas communicating with the odorant storage tank for maintaining the tank at a desired positive pressure above the pressure of the pipeline;

an injection conduit communicating the odorant storage tank with the pipeline;

a metering valve located within the injection conduit for metering chemical to be injected into the pipeline, the metering valve being adjustable between a drop wise setting for metering chemical into the pipeline on a drop by drop basis and a steady flow setting for metering chemical on a steady state flow basis;

an ultrasonic measuring unit associated with the metering valve for measuring flow passing through the metering valve and into the pipeline, the ultrasonic measuring unit including one or more pairs of ultrasonic transmitters and ultrasonic receivers which act as either proximity sensors or by measuring transit time to provide a measurement of the flow rate of odorant on either a drop by drop basis or in a steady state flow condition; and wherein an injection chamber receives odorant passing from the odorant storage tank and wherein natural gas from the pipeline flows to and from the injection chamber to provide a pressure head on the odorant in the injection chamber.

2. The system of claim 1, wherein the injection chamber includes a sensor which communicates with a controller for measuring and monitoring the odorant which passes from the injection chamber to the pipeline.

3. A method of odorizing natural gas flowing through a pipeline by injecting odorant into the pipeline at a controlled rate, the method comprising the steps of:

providing an odorant storage tank containing an odorant to be injected;

communicating a pressurized source of inert gas with the odorant storage tank for maintaining the tank at a desired positive pressure above the pressure of the pipeline;

providing an injection conduit communicating the odorant storage tank with the pipeline;

locating a metering valve within the injection conduit for metering chemical to be injected into the pipeline, the metering valve being adjustable between a drop wise setting for metering chemical into the pipeline on a drop by drop basis and a steady flow setting for metering chemical on a steady state flow basis;

mounting an ultrasonic measuring unit on the injection conduit in operative relationship with the metering valve for measuring flow passing through the metering valve and into the pipeline, the ultrasonic measuring unit including one or more pairs of ultrasonic transmitters and ultrasonic receivers which act as either proximity sensors or by measuring transit time to provide a measurement of the flow rate of odorant on either a drop by drop basis or in a steady state flow condition;

wherein the metering valve includes a motor driven flow control valve which controls the flow of odorant through an orifice;

wherein the ultrasonic transducers are mounted exterior to the injection conduit; and further comprising the steps of providing an injection chamber which communicates by means of a flow conduit with the odorant storage tank for receiving odorant passing from the odorant storage tank and wherein natural gas from the pipeline flows to and from the injection chamber by means of an additional flow conduit to provide a pressure head on the odorant in the injection chamber.

4. The method of claim 3, wherein the injection chamber includes a sensor which communicates with a controller for measuring and monitoring the odorant which passes from the injection chamber to the pipeline.

5. The method of claim 4, wherein dropwise flow through the metering valve is measured by the ultrasonic measuring unit until the flow exceeds a predetermined maximum drip frequency, and wherein the sensor in the injection chamber is used thereafter to measure the flow of odorant to the pipeline.

6. A system for injecting a chemical from a chemical supply into a natural gas or liquified petroleum gas pipeline at a desired injection rate, comprising:

an chemical storage tank containing a chemical to be injected;

an injection conduit communicating the chemical storage tank with the pipeline;

a metering valve located within the injection conduit for metering chemical to be injected into the pipeline, the metering valve being adjustable for metering chemical into the pipeline on a drop by drop basis;

a measuring unit associated with the metering valve for measuring flow passing through the metering valve and into the pipeline, the measuring unit including an impingement surface located in a drip chamber, the impingement surface comprising the diaphragm of a piezoelectric sensor, contact between a drop of odorant and the impingement surface serving to generate sound waves which are measured and counted.

7. The system of claim 6, wherein the sound waves are detected by a crystal associated with the piezoelectric sensor, the crystal serving to convert the sound waves to a proportional voltage charge which results in a voltage differential between spaced electrodes and resulting voltage spikes, the voltage spikes between the electrodes being measured and counted as an indication of the flow of odorant to the pipeline.

* * * * *